(12) United States Patent
Sasaki et al.

(10) Patent No.: US 6,675,478 B2
(45) Date of Patent: Jan. 13, 2004

(54) FREE SPHERICAL BALL BEARING

(75) Inventors: Gen Sasaki, Kitasaku-gun (JP);
Shinichi Akao, Kitasaku-gun (JP);
Kennosuke Kariya, Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 10/004,818

(22) Filed: Dec. 7, 2001

(65) Prior Publication Data

US 2002/0037121 A1 Mar. 28, 2002

Related U.S. Application Data (62) Division of application No. 09/511,688, filed on Feb. 23, 2000, now Pat. No. 6,497,958.

(30) Foreign Application Priority Data

Nov. 22, 1999 (JP) .............................. 11-331280

(51) Int. Cl.[7] .......................... B21D 53/12; B21D 53/10
(52) U.S. Cl. ........................... 29/898.061; 29/898.064; 29/898.043; 29/898.07; 29/411.1
(58) Field of Search ..................... 29/898.061, 898.062, 29/898.064, 898.065, 898.067, 898.09, 898.043, 898.056, 898.07, 898.058, 898.059, 898.051, 441.1, 442; 384/212, 38, 497, 495, 496, 2

(56) References Cited

U.S. PATENT DOCUMENTS

| | | | | |
|---|---|---|---|---|
| 2,077,582 A | * | 4/1937 | Peo | |
| 2,260,283 A | * | 10/1941 | Halfold et al. | |
| 2,887,334 A | * | 5/1959 | Adams, Sr. | |
| 2,983,558 A | | 5/1961 | Rudy | |
| 3,004,786 A | * | 10/1961 | Herbenar | |
| 3,084,417 A | | 4/1963 | Picca | |
| 3,231,299 A | * | 1/1966 | Birney et al. | |
| 3,269,757 A | * | 8/1966 | Maxeiner | |
| 3,909,084 A | * | 9/1975 | Snidar et al. | |
| 4,005,514 A | * | 2/1977 | McCloskey | |
| 4,511,277 A | * | 4/1985 | McCabe | |
| 4,934,840 A | | 6/1990 | Paret | |
| 5,062,208 A | * | 11/1991 | Goforth | |
| 6,209,206 B1 | * | 4/2001 | Harris et al. | |

FOREIGN PATENT DOCUMENTS

| | | | |
|---|---|---|---|
| EP | 0778421 | * | 6/1997 |
| FR | 504395 A | | 7/1920 |
| WO | WO 82/00050 | | 1/1982 |

* cited by examiner

*Primary Examiner*—Gregory Vidovich
*Assistant Examiner*—Eric Compton
(74) *Attorney, Agent, or Firm*—Oliff & Berridge, PLC (57) ABSTRACT

Balls are supported between the spherical inner race 5 and the outer race 6 which surrounds one potion of the inner race 6 through the resiliently transformable shell-like retainer 7. By making the inner race 5 and outer race 7, which influence the bearing precision greatly, to be formed in a unit respectively, the bearing precision is increased. For reference, although the retainer is divided, the retainer 7 bears merely the ball holding function and its transformation and the position relation in assembling state do not influence the bearing precision.

4 Claims, 10 Drawing Sheets

Fig. 13 PriorArt

FREE SPHERICAL BALL BEARING

This is a Divisional of application Ser. No. 09/511,688 filed Feb. 23, 2000. Now U.S. Pat. No. 6,497,958. The entire disclosure is hereby incorporated by reference herein in its entirety.

BACKGROUND OF THE INVENTION

1. Field of the Invention

The present invention relates to a ball joint highly improved in precision, endurance and functional smoothness, and an assembling method thereof.

2. Prior Art

Figure 13:
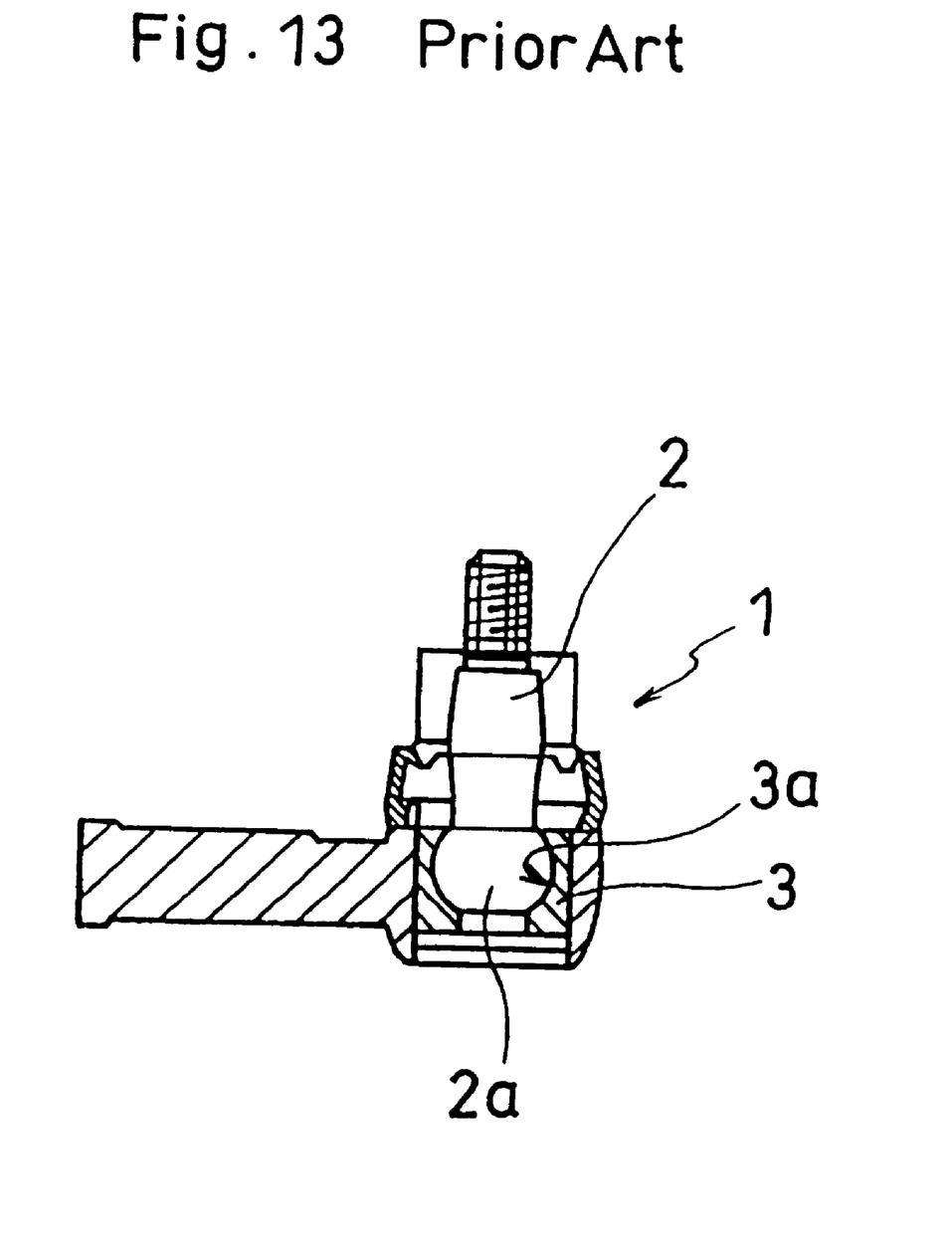
FIG. 13 is a sectional view of a ball joint of a conventional art.

Conventionally, in an independent suspension of vehicle, since there is a necessity of changing of steering angle of wheels without deteriorating its function, a ball joint is used at a joint portion between a knuckle arm and a connecting rod, as shown in FIG. 13, the ball joint 1 comprises a stud 2 at one end of which a spherical body 2a is provided and a race 3, and the spherical body 2a is held by the race 3. The spherical body 2a is held due to a guide face 3a of the race 3 in such a manner as it is not slipped out from the race 3 and a swing of a spherical body 2a in so-called six axial directions (X-axis, Y-axis, Z-axis, θx-axis, θy-axis and θz-axis) is allowed. For reference, between the spherical body 2a and the guide face 3a grease is supplied to guarantee its slidability.

In a conventional ball joint 1, since it is free in its rotation direction and superior in its load resistance and endurance, it has widely used in conventional vehicle elements of vehicle suspension. However, since a displacement between the spherical body 2a and the guide face 3a is secured by being slid, there is a deterioration in its functional precision and operational smoothness, and since the swing angle is small, the applicable field has not spread to the table supporting mechanism of a multi-shaft machinery center.

Accordingly, to the above table supporting mechanism which requires a micron unit of precision and a large swing angle, with a combination of plural number of a single freedom of joint a rotary operation of three or six shafts has been realized. However, the joint of such combination which is of a multi-freedom of joint has caused to be of complicated in structure and increased in weight, in addition, so that, in order to position the shaft precisely, it is necessary to consider to control the operation in consideration of the deviation of the center of the shaft.

SUMMARY OF THE INVENTION

The present invention has been made in the light of the above problem, and the purpose thereof is to provide a bearing mechanism which is not limited in the rotational direction, superior in load resistance and endurance, large in swing angle and of a high level of precision of operation and functional smoothness.

In order to solve the above problem, a free spherical ball bearing according to a first aspect of the present invention, between a spherical inner race and an outer race prepared in a unit with the inner race while surrounding a part thereof through a resiliently changeable retainer balls are supported.

In this invention, since, by the rotation of the balls, a deflection between the spherical inner race and the outer race formed in a unitary manner with the inner race surrounding a portion of the inner race, is secured, it is superior in an operational smoothness. Further, since the outer race is a unitary member, it becomes possible to obtain easily a desired precision of part to attain a high operational precision. In addition, depending on the area by being surrounded with the inner race, the mutual swing angle between the inner race and the outer race can be determined.

And that, since the retainer is possible to be resiliently deformed, at the time of assembling the outer race, the inner race and the balls, the interference of each member is absorbed by the deformation of the retainer.

Further, according to a second aspect of the free spherical ball bearing of the present invention, the retainer is configured shell-like and split at least in one portion thereof. Accordingly, the shell is resiliently deformed positively at its split portion, and absorbs any interference between members assembled.

Further according to a third aspect of the free spherical ball bearing of the present invention, the retainer is formed with a combination of at least two members. According to this structure, by displacing the position relation between two members within the area in which a resilient deformation is possible, the interference between members is absorbed when the outer race, the inner race and the balls are assembled.

Further, according to a fourth aspect of the free spherical ball bearing of the present invention, the retainer is formed with a combination of two symmetrical members. Therefore, there is no need of preparing plural members to form a retainer, thereby a simplification of the structural parts is intended.

Further, according to a fifth aspect of the free spherical ball bearing of the present invention, it is formed with members different in size. In this case, it can make the members deformed in configuration in such a manner as it is configured effectively to generate the deformation of the retainer in order to absorb an interference, between the outer race, the inner race and the balls at the time of assembling.

According to a sixth aspect of the free spherical ball bearing of the present invention, a dividing line of the retainer is provided in priority of the arrangement of the balls. Said balls are requested to reduce a rotary resistance of the bearing and increase the endurance being arranged in such a manner as the load between the outer race and the inner race is dispersed. For that purpose, the above dividing line is provided without braking such arrangement to avoid it from being deteriorated in such function.

Further, according to a seventh aspect of the free spherical ball bearing of the present invention, the retainer comprises a ball receptor portion to accept the balls by being resiliently deformed and a grease receptor to dispose the grease. By this structure, the balls can be coupled with the receptor from the outside of the retainer. In addition by disposing the grease in the grease receptor, the lubrication of the outer race, the inner race and the balls is secured.

Further, according to an eighth aspect of the free spherical ball bearing of the present invention, on the end of the retainer a seal is provided to seal the grease. Thereby, the grease is secured to be sealed.

According to a ninth aspect of the free spherical ball bearing according to the present invention, to the inner race a stud is secured. Accordingly, this stud secures a six axial rotational movement due to a relative displacement of the inner race to the outer race.

Further, according to a tenth aspect of the free spherical ball bearing of the present invention, a shaft is supported slidably due to the inner race. Accordingly, the shaft is adapted to be secured with the six axial rotation movement by the relative displacement of the inner race to the outer race, and given a frequent appearance operation to the inner race.

In addition, according to eleventh aspect of the free spherical ball bearing, to at least the surfaces of the inner race, the outer race and the balls, a hardening treatment is applied to improve the load resistance and the endurance.

In order to solve the above problem an assembling method according to a twelfth aspect of the free spherical ball bearing is characterized in that, between the spherical inner race and the outer race which surrounds a part of the inner race in a unit, balls are supported by the shell-like retainer which is divided at least at one portion and deformable resiliently, the inner race is covered with retainer and after inserting in the outer race, the balls are coupled with the retainer.

According to this invention, at the time of inserting the inner race and the retainer into the outer race, by deforming the retainer resiliently by the amount of the gap between the inner race to expect to absorb the interference between the outer race and the retainer. Since the retainer is divided at least at one portion, at said dividing line a positive resilient deformation is generated and from the outside of the retainer the balls are coupled with. The balls coupled with the retainer are maintained due to a resilient restoring force of the retainer.

Further, according to a thirteenth aspect of the assembling method of the free spherical ball bearing, the outer diameter of the retainer is made to be shortened and inserted into the outer race. In accordance with this invention, the outer diameter of the retainer is made to be reduced resiliently and at the time of inserting of the inner race and the retainer into the outer race the interference between the outer race and the retainer is absorbed. And, after being inserted, the retainer is restored in the original configuration due to the restoring force of itself.

According to a fourteenth aspect of the assembling method of the free spherical ball bearing of the present invention, after covering the inner race with the retainer, the retainer is deflected along the dividing line and inserted in the outer race. In accordance with this invention, by deflecting the retainer along its dividing line, positively a deformation is made to be generated with the retainer. And, the interference of the outer race and the inner race at the time of inserting of the inner race and the retainer into the outer race is absorbed. After inserting, the retainer restores in its original configuration due to its restoring force.

According to a fifteenth aspect of the assembling method of the free spherical ball bearing of the present invention, the retainer is covered with the divided retainer portion, and after being inserted into the outer race, and other portion divided is inserted in the gap between the inner race and the outer race. In accordance with this invention, by inserting one portion of the retainer divided in a plurality into the outer race with the inner race, the interference at the time of inserting process is diminished, and after that, by inserting other part of the retainer into the gap between the inner race and the outer race, the shell-like retainer is finished.

DETAILED DESCRIPTION OF THE PREFERRED EMBODIMENTS

Hereinafter, an embodiment is explained based on the attached drawings. In the drawings, the identical signs are attached to the identical or equivalent parts to the conventional arts and the explanations thereof are omitted.

Figure 1:
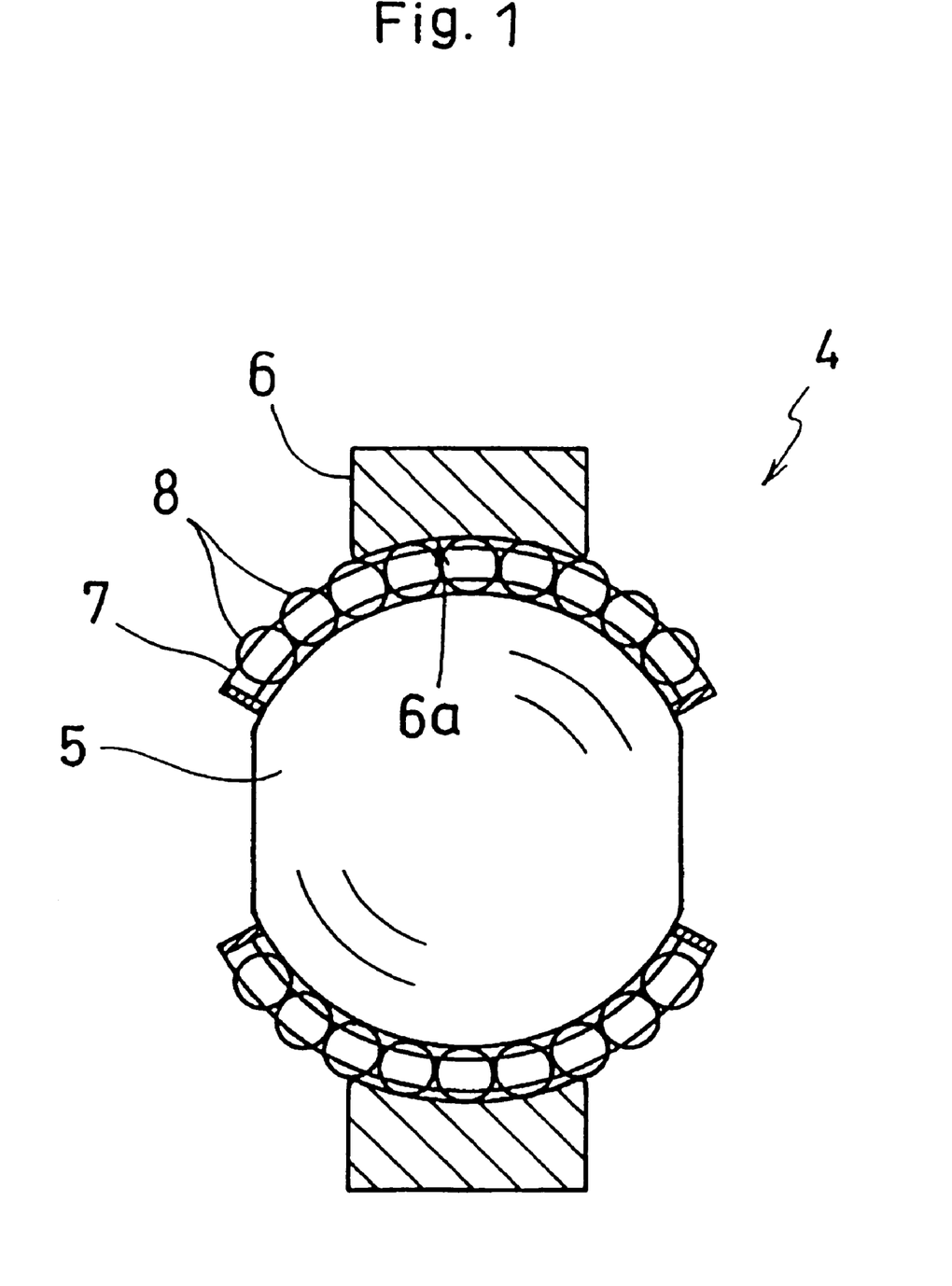
FIG. 1 is a perspective view of an embodiment of a free spherical ball bearing of the present invention partially in section.

FIG. 1 shows a partially sectional drawing of an embodiment of a ball joint 4 (hereinafter named as a free spherical ball bearing) of the present invention. This spherical ball bearing 4 is formed by supporting balls 8 between a spherical inner race 5 and an outer race 6 surrounding a part of the inner race 5 through a shell-like retainer 7 resiliently transformable. The outer race 6 is a part formed in a unitary manner, and is easy to respond to a requisite for a high surface precision on a guide face 6a. Further, the retainer 7 is structured with a resiliently transformable material such as resin (nylon system resin, PEEK system resin), and it is divided at least at one portion as explained later.

Figure 2:
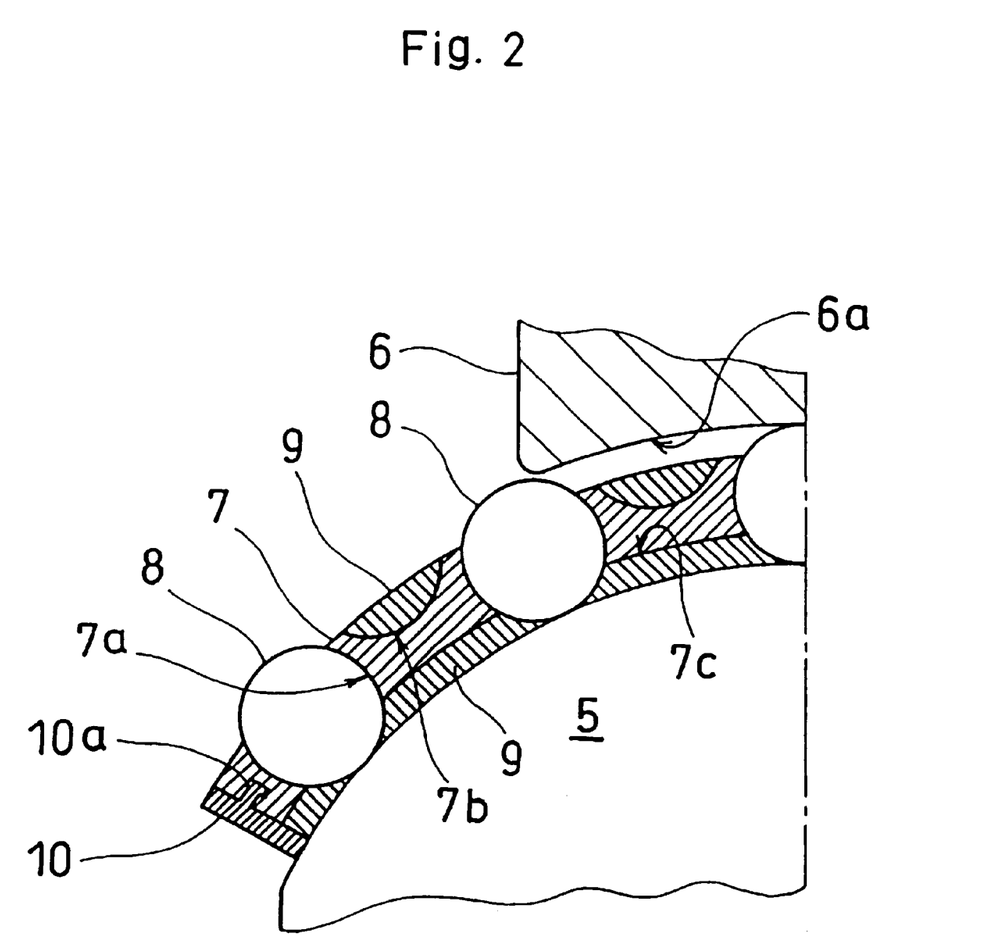
FIG. 2 is a partially sectional drawing of FIG. 7 showing the the enlarged retainer of the free spherical ball bearing of FIG. 1.

FIG. 2 is an enlarged retainer 7 partially in section. The retainer 7 comprises a ball receptor 7a to support a balls and a grease receptor 7b and 7c to deposit grease. The ball receptor 7a is, in order to diminish the rotary resistance of the free spherical bearing 4 and increase the endurance, adapted to be aligned in such a manner as each of the balls 8 can receive a dispersed load between the outer race 6 and inner race 5. Further, the ball receptor 7a can receive the balls 8 from the outside of the retainer 7 by being deformed approximately resiliently. And, the balls 8 coupled in the ball receptor 7a are kept in the ball receptor 7a by the resilient recovering force to prevent it from being removed.

The grease receptor 7b is a recessed surface provided for supplying the grease between the outer surface of the retainer 7 and the guide face 6 of the outer race 6. Now, in the case where the grease receptor 7b is provided, in order to prevent the grease from being dispersed, it is preferable to cover the outside of the retainer 7 with a bellow-like cover (not shown). Such a bellow-like cover is effective also for increasing a dust-proof characteristic for the free spherical ball bearing 4.

The grease receptor 7c is for depositing the grease in the gap between the inner surface of the retainer 7 and the surface of the inner race 5. And, a seal 10 for sealing such a grease 9 is provided at the end of the retainer 7. Now, The fastening of the seal 10 to the retainer 7 can be carried out by, as shown in figure, engaging an engage pawl 10a with an engaging hole formed on the retainer 7, otherwise by fastening with a screw or adhering with a glue. Further, it is also possible to mold the seal 10 in a unitary manner with the retainer 7.

Figure 3A:
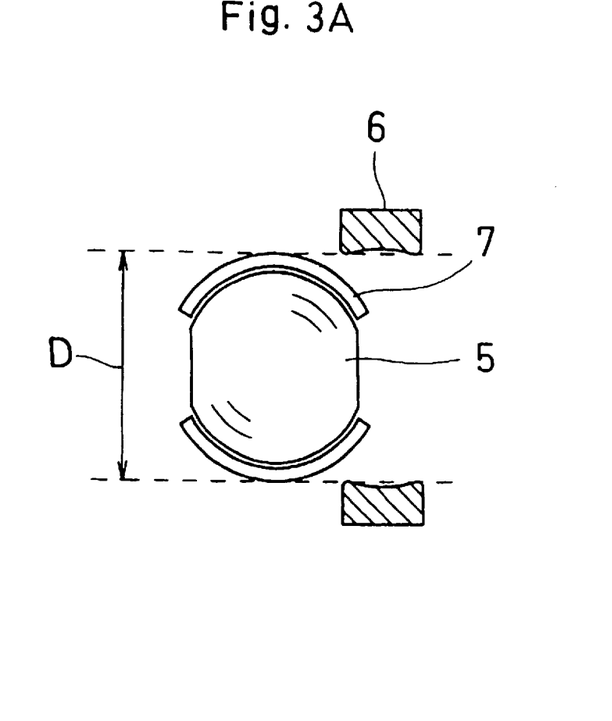
FIGS. 3A–3C show assembling processes of a free spherical ball bearing of FIG. 1, wherein the inner diameter of the outer race is larger than the outer diameter of the retainer.
Figure 3B:
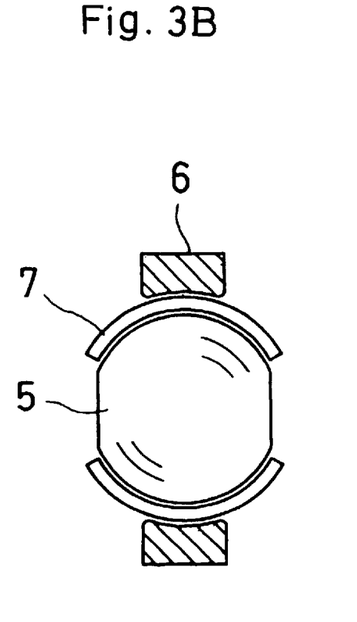
Figure 3C:
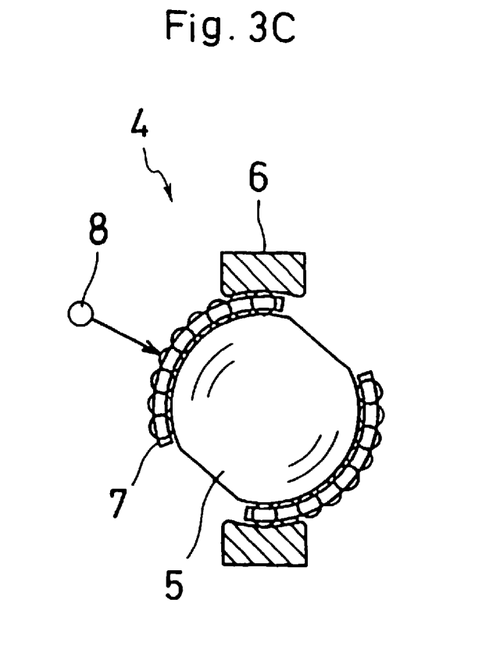

Here, the assembling processes of the free spherical ball bearing 4 are explained. FIG. 3 shows an assembling process in a case where an inner diameter D of the outer race 6 is larger than the outer diameter of the retainer 7. First, as shown in FIG. 3A, the inner race 5 is covered with the shell-like retainer 7, and as shown in FIG. 3B, before the balls 8 are coupled with the retainer 7, the inner race 5 and the retainer 7 are inserted in the outer race 6. And, as shown in FIG. 3C, the retainer 7 is made to be turned within the outer race 6 to expose the outer surface of the retainer 7 and the free spherical ball bearing 4 is finished by coupling the balls 8 with the ball receptor 7a (see FIG. 2) of the retainer 7.

In FIG. 4, assembling processes of the free spherical ball bearing in a case where the inner diameter D of the outer race 6 is smaller than the outer diameter of the retainer are shown. Such a relation is generated when, in order to increase a rotary precision of the free spherical ball bearing 4 and an allowability of the load, the width of the outer race 6 is widened to increase the area of the guide face 6a.

Figure 4A:
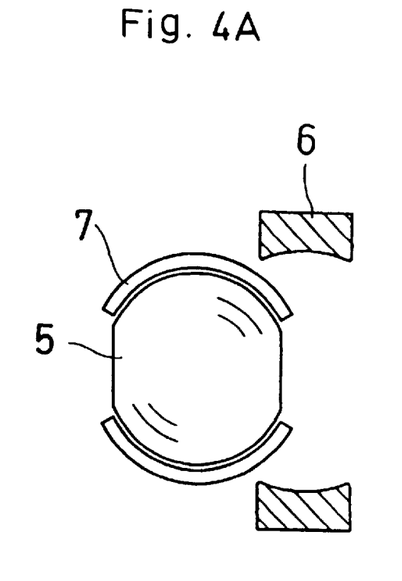
FIGS. 4A–4D show assembling processes of a free spherical ball bearing of FIG. 1, wherein the inner diameter of the outer race is smaller than the outer diameter of the retainer.
Figure 4B:
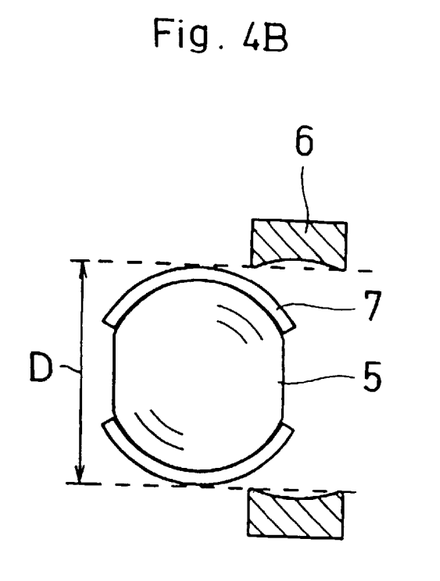
Figure 4C:
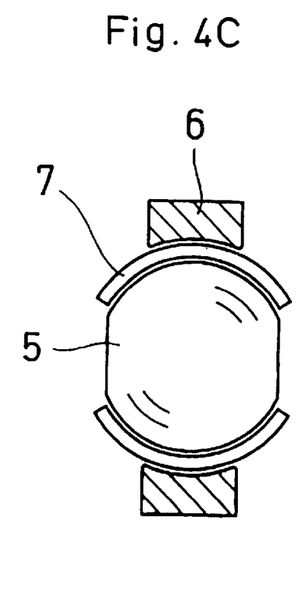
Figure 4D:
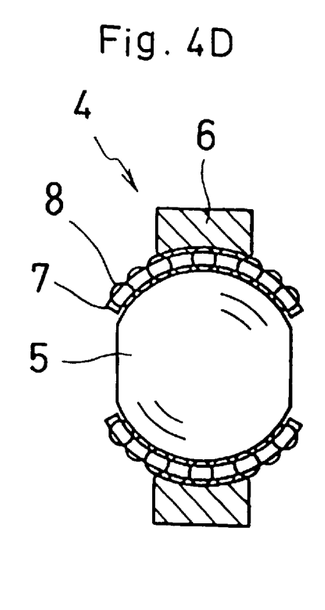

First, as shown in FIG. 4A, the inner race 5 is covered with the shell-like retainer 7. Subsequently, as shown in FIG. 4B, the outer diameter of the retainer 7 is made to be reduced less than the inner diameter D of the outer race 6. And, the interference between members at the time of assembling the inner race 5 and the retainer 7 with the outer race 6 is absorbed by the deformation of the retainer 7. In that state, as shown in FIG. 4C, the inner race 5 and the retainer 7 are inserted in the outer race 6. Finally, as well as shown in FIG. 3C, within the outer race 6 the retainer 7 is made to be turned to expose the outer surface and by coupling the balls 8 with the balls receptor 7a (see FIG. 2), as shown in FIG. 4D, the free spherical ball bearing 4 is finished.

What is needed here is an idea to reduce the outer diameter of the retainer 7 less than the inner diameter D of the outer race 6, here are shown several examples.

Figure 5:
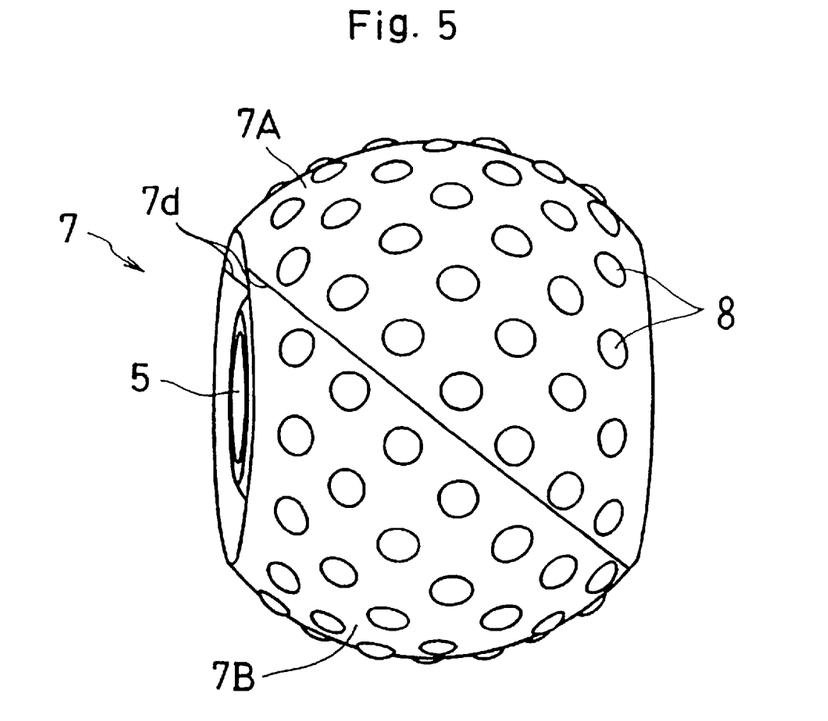
FIG. 5 is a stereo figure of the first example of the retainer of the free spherical ball bearing shown in FIG. 1 showing schematically.

FIG. 5 shows the first example of the retainer 7 schematically. As shown, the retainer 7 is divided into two parts 7A and 7B. Further, the dividing line 7d to divide the retainer 7 into 7A and 7B is provided without disturbing the given arrangement of the balls 8 i.e. in priority of the arrangement of the balls 8. Therefore, the arrangement of the balls 8 to receive the load by being dispersed from the load which may be on between the outer race and the inner race, is not disturbed by dividing the retainer 7. And that, two portion 7A and 7B are symmetric with each other there is no need of preparing a plurality of parts to constitute the retainer, and one kind mold can be sufficient for molding the two parts 7A and 7B.

Figure 6A:
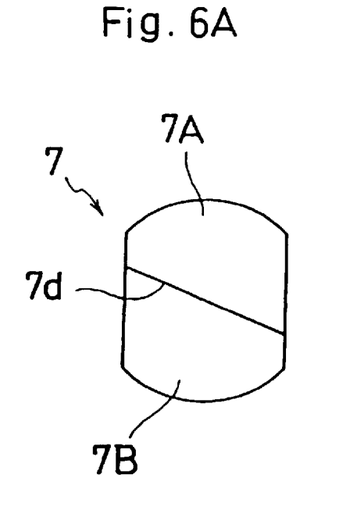
FIGS. 6A–6B are to show how to reduce the outer diameter of the retainer shown in FIG. 5.
Figure 6B:
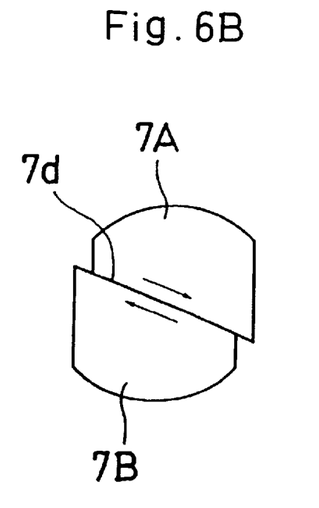

In order to reduce the diameter of the retainer 7 less than the inner diameter D of the outer race 6, as shown in FIG. 6(A), in the state where the inner race 5 (not shown) is covered with the retainer 7, as shown in FIG. 6(B), two parts 7A, 7B may be made to be deflected along with the dividing line 7d. Now, such deflection is generated by shortening the gap provided between the surface of the inner race 5 and the inner surface of the retainer 7 and deforming the two parts 7A and 7B resiliently.

Figure 7:
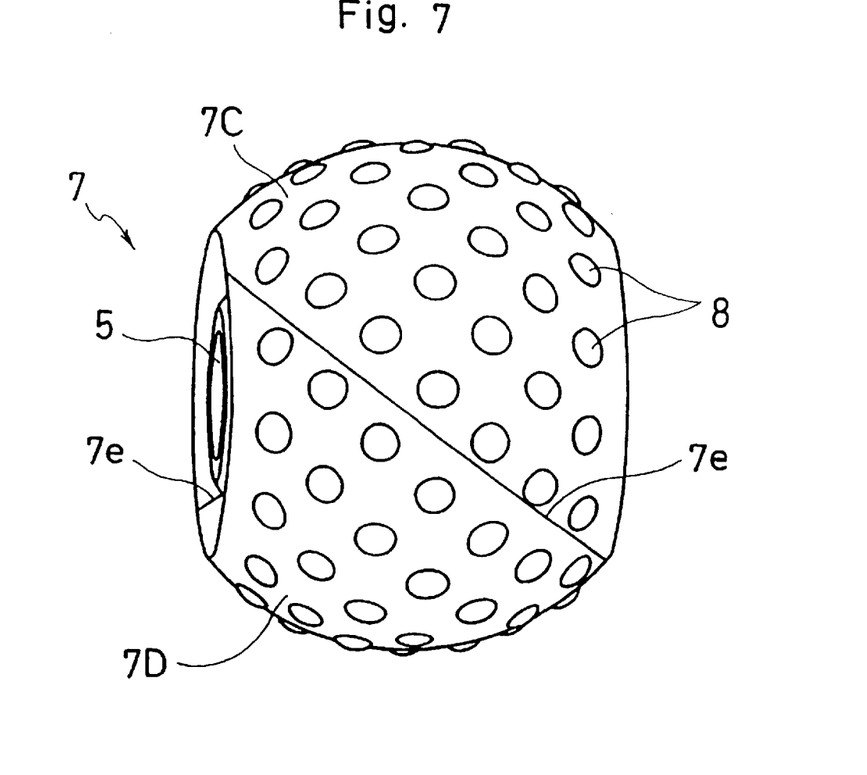
FIG. 7 is a stereo figure of the second example of the retainer of the free spherical ball bearing in FIG. 1 showing schematically.

In FIG. 7, the second example of the retainer 7 schematically. In this case too, as well as the first example of the retainer 7 as shown in FIG. 5, the retainer 7 is divided in two parts 7C and 7D and these are symmetrical with each other. Further, the dividing line 7e is provided in priority of the arrangement of the balls 8. However, which is different from the first example shown in FIG. 5 in the point that the dividing line 7e is formed in the crossing direction with each other.

Figure 8A:
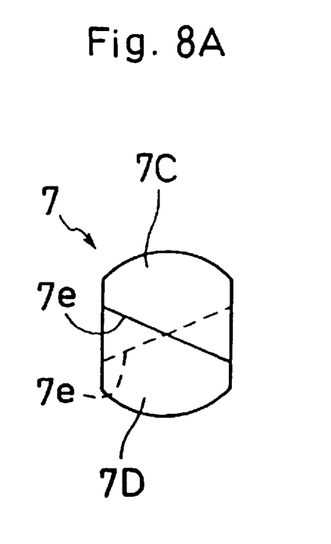
FIGS. 8A–8C are to show how to reduce the outer diameter of the retainer shown in FIG. 7.
Figure 8B:
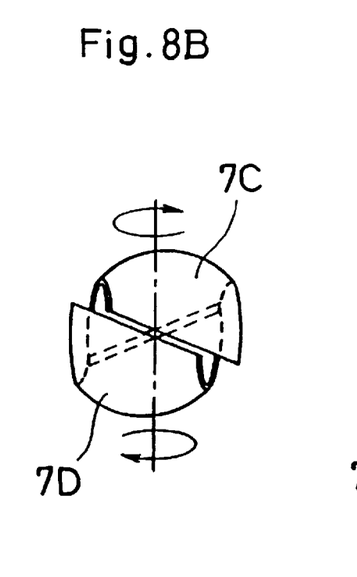
Figure 8C:
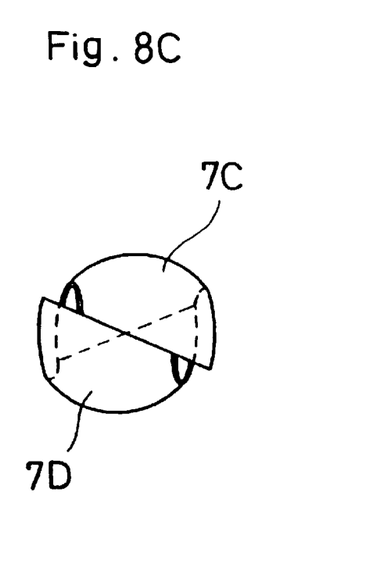

In the case of the retainer 7 shown in FIG. 7, as shown in FIG. 8(A), after covering the inner race 5 (not shown) with the retainer 7, as shown in FIG. 8(B), by turning the two parts 7C and 7D relatively along with the dividing line 7e, as shown in FIG. 8(C), it becomes possible to reduce the outer diameter of the inner race 5 less than the inner diameter D of the outer race 6. Now, such deflection is generated by shortening the gap between the surface of the inner race 5 and the inner surface of the retainer 7 and deforming the two parts 7C and 7D resiliently.

Figure 9:
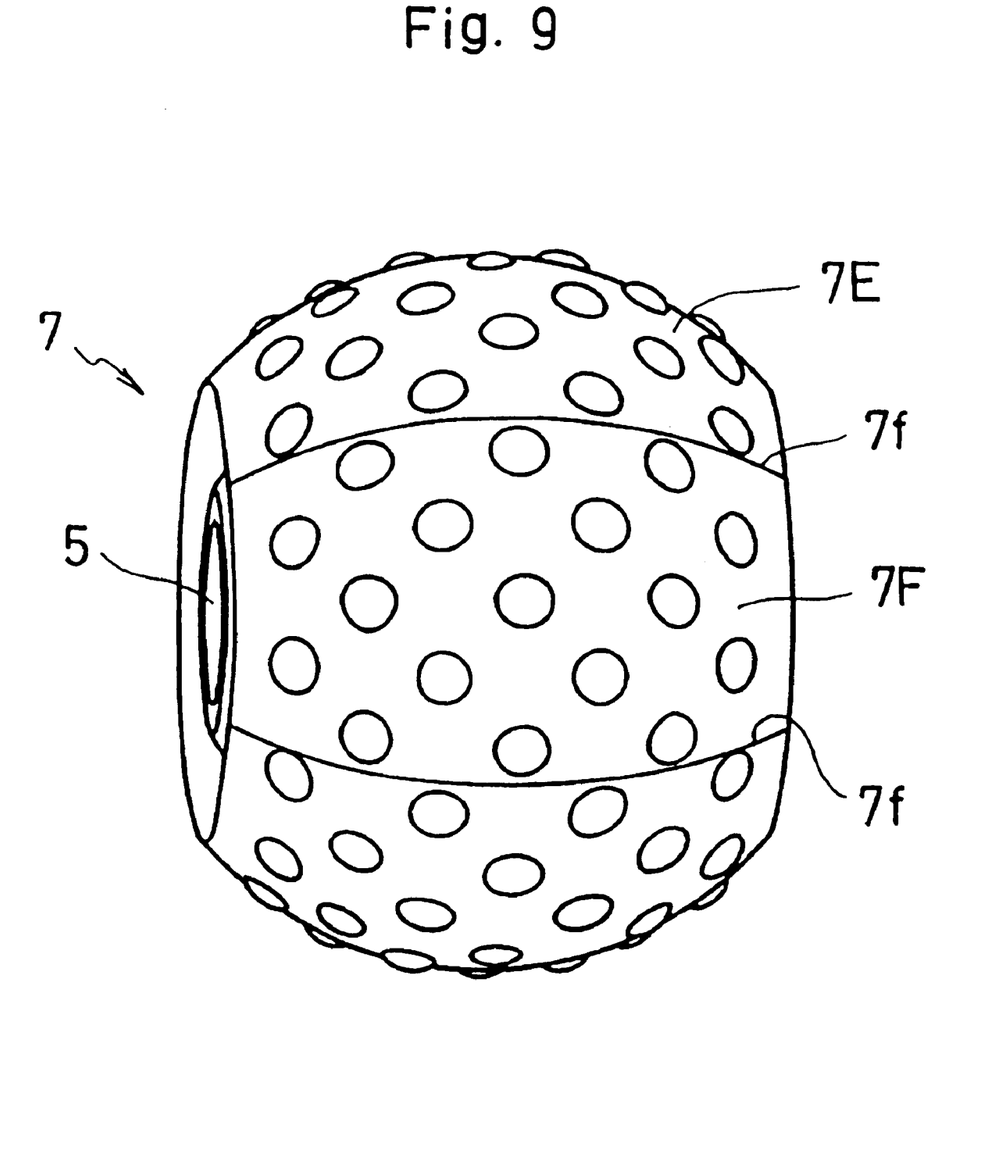
FIG. 9 is a stereo figure of the third example of the retainer of the free spherical ball bearing in FIG. 1 showing schematically.

Further, as the third example of the retainer 7 shown in FIG. 9, with two portions 7E, 7F which are different in size with each other, the retainer 7 can be formed. In this case, while covering the inner race 5 with the larger part 7E, by making the diameter of the 7E reduced less than the inner diameter D of the outer race 6, and inserted in the outer race 6, by inserting into the outer race 6, the interference of the members at the time of inserting is made gone. After that, by inserting the smaller side of part 7F in the gap between the inner race 5 and the outer race 6, the shell-like retainer 7 is finished. Thus, by forming the retainer 7 with two parts 7E, 7F of different size by making the outer diameter of the retainer smaller while covering the inner race 5 with the larger side of part 7E, and by making the resilient deformation amount of the part 7E at that time larger, it is possible to insert it easier in the outer race 6. Further, the smaller side of part 7F, due to the smaller size it is easy to be inserted in the gap between the inner race 5 and the outer race 6 and without difficulty, the assembly of the free spherical ball bearing 4 can be carried out.

Now, the configuration of two parts 7E, 7F may be formed in such a manner as the ball arrangement is made in priority, and may be preferably formed in such a manner as, after the part E is inserted in the outer race 6, the part 7F can be inserted, for instance, the inserting direction of the part 7F may be limited toward the right side from the left side of FIG. 9.

Figure 10:
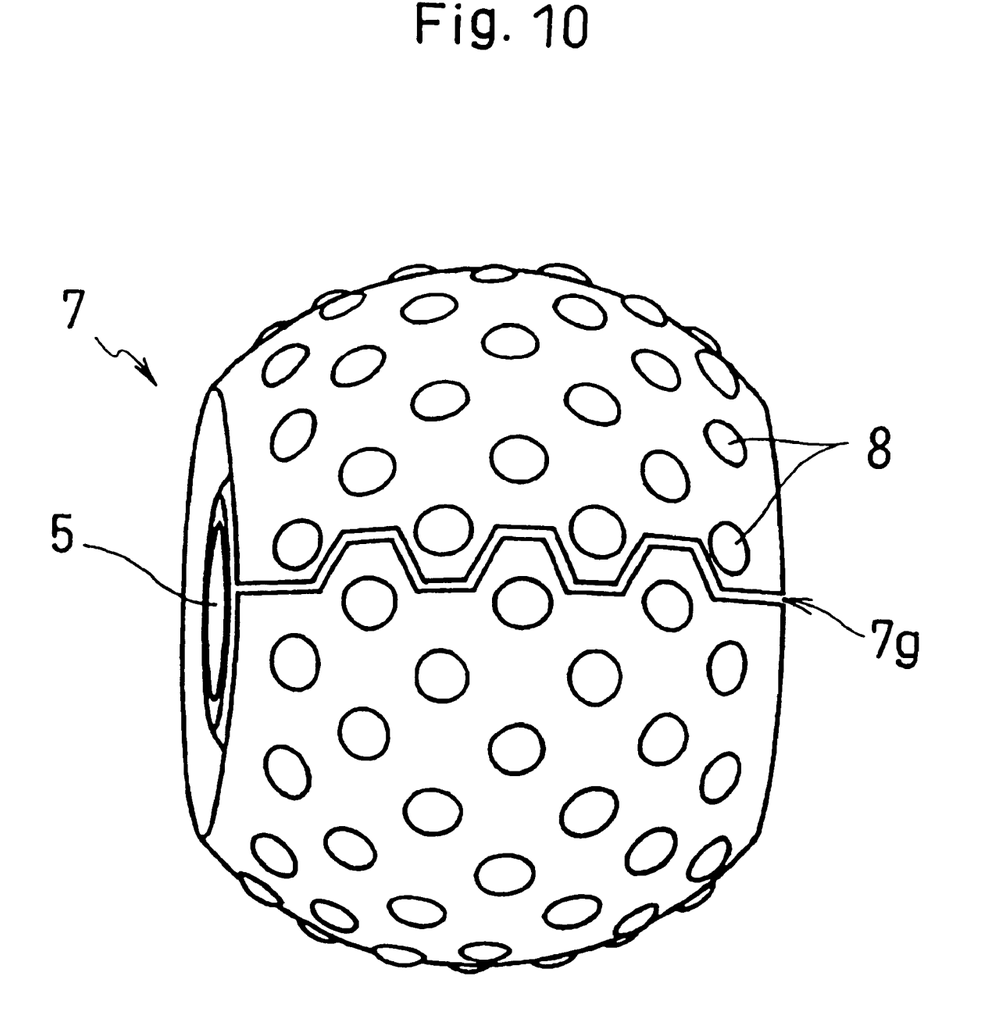
FIG. 10 is a stereo figure of the fourth example of the retainer of the free spherical ball bearing in FIG. 1 showing schematically.

Further, as the fourth example of the retainer 7 as shown in FIG. 10, it is formed as having a C-letter in section by being divided at one portion, and at the time of inserting the inner race 5 and the retainer 7 into the outer race 6, by making the retainer 7 deformed resiliently in such a manner as it covers the gap 7g of the divided portion, the outer diameter of the retainer is made to be reduced to cancel the interference between members at the time of insertion working. Now, in this case too, it is adapted to form the dividing line in the priority of the arrangement of balls 8. Further, although it is not shown, it is also possible to divide the retainer 7 in three or more to ease the assembly.

Here, the function and effect to be obtained from the embodiment of the present invention as constituted above are summarized. First, the free spherical ball bearing 4 is, different from the conventional ball joint 1, since it is a ball bearing, superior in not only the load resistance and endurance but also the operation precision and the operation smoothness, and also its applicable field can be spread to a table supporting mechanism of a multiple shaft machining center.

Further, the free spherical ball bearing 4 has been improved in its bearing precision by making the inner race 5 and the outer race 6, which contribute to bearing precision greatly, in a unitary manner as a part respectively. Now, although the retainer 7 is divided, the retainer 7 is only for holding the balls 8 and which does not influence on the bearing precision by its deformation or its position relation in assembling state.

Further, since the dividing lines 7d, 7e and 7f, and the gap 7g are provided in priority of the arrangement of the balls 8, the arrangement of each ball 8 is not deteriorated for receiving the load on between the outer race and the inner race in a dispersed manner, thereby, an increase of rotary resistance of the bearing and a decrease of endurance are not invited.

Further, as the retainer 7 shown in FIGS. 5 and 7, by dividing it in two parts symmetrical each other 7A and 7b or 7C and 7D, two parts can be molded in one kind mold to reduce the parts cost. Contrary to that, as the retainer 7 shown in FIG. 9, if it is formed with two parts 7E and 7F different in size, by increasing the deformation amount of the part 7E at the time of inserting it into the outer race 6, that inserting working can be made more easier. And, as the retainer 7 shown in FIG. 10, the assembling of what is divided merely at one portion becomes possible, and further, it is possible to divide the retainer 7 into three or more. Accordingly, by selecting appropriately the dividing manner of the retainer 7, a necessary free spherical ball bearing 4 can be obtained.

Further, since the retainer 7 comprises a ball receptor 7a to receive the ball 8 by being deformed resiliently, after inserting the inner race 5 and the retainer 7 into the outer race 6, it becomes possible to couple the ball 8 with the ball receptor 7a. Accordingly, the interference between members at the time of assembling is gone, to ease the assembling work. For reference, the ball 8 coupled with the ball receptor 7a is held due to the resilient restoring force and there is no anxiety of being removed.

Further, since the retainer 7 comprises the grease receptor 7b, 7c to deposit the grease 9, the lubrication between the inner race 5, the outer race 6, the retainer 7 and the balls can be secured.

And that, the retainer 7 is provided with the seal 10 to seal the grease to the end thereof, the grease 9 is securely sealed to maintain the lubrication for a long time.

Figure 11:
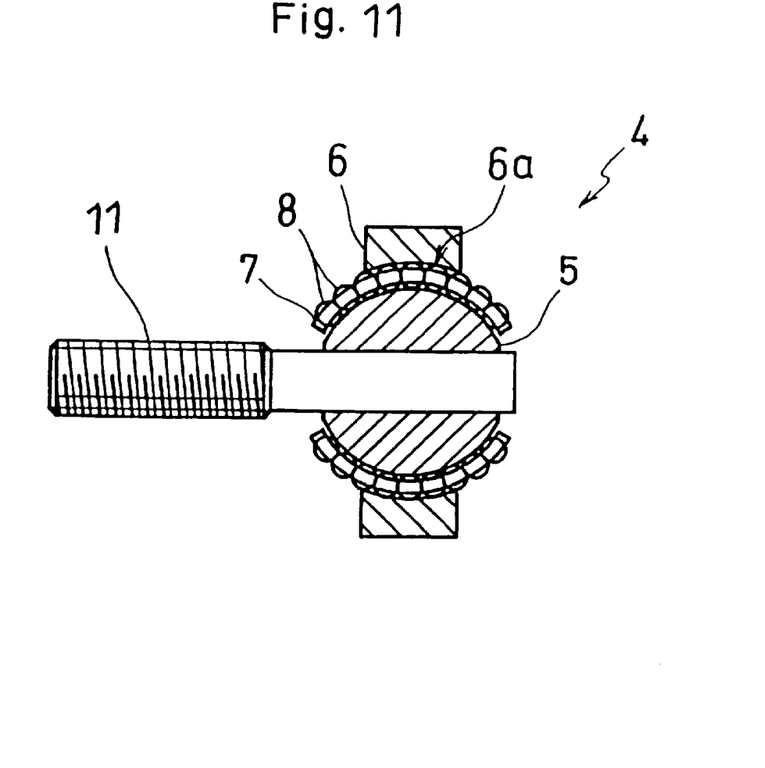
FIG. 11 is a schematic diagram showing an example where a stud is fastened to the inner race of the free spherical ball bearing in FIG. 1.

Now, in the thus constituted free spherical ball bearing 4, since it can generate freely a swing in so-called six axial directions between the inner race 5 and the outer race 6, as shown in FIG. 11, by fastening (fixing, bolting, welding, adhering) the stud 11 to the inner race, the stud 11 can be realized to move freely in a three dimension. Here, the swinging angle of the stud 11 is adapted to be determined at the position where the stud 11 abuts to the outer race 6. And, when by widening the width of the outer race 6 and spreading the area of the guide face 6a, the rotary precision of the free spherical ball bearing 4 and the load to be allowed are intended to be increased, the swing angle of the stud 11 becomes small. According to the study of the present inventors, it is confirmed that the swing angle of the stud 11 can be secured upto the maximum 50 degrees.

Figure 12:
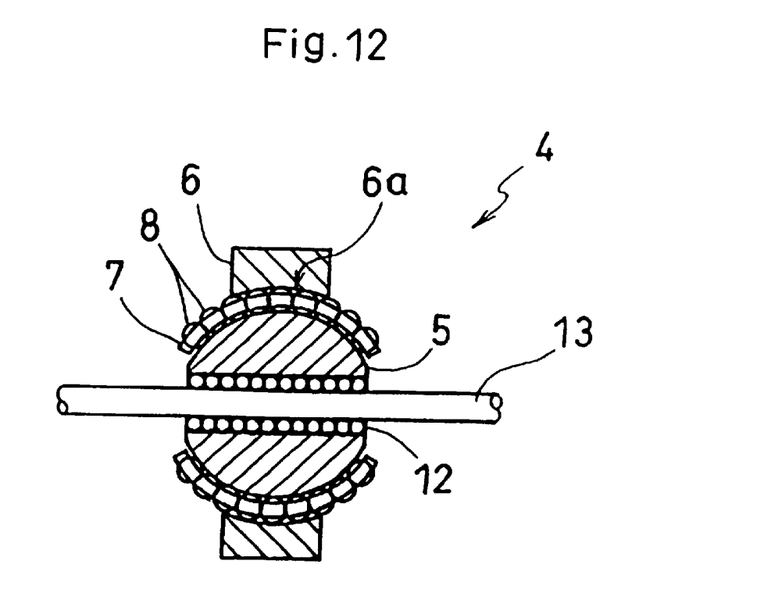
FIG. 12 is a schematic diagram showing an example where a shaft is supported slidably by the inner race of the free spherical ball bearing shown in FIG. 1.

Further, as shown in FIG. 12, within the inside of the inner race 5 a linear ball bearing 12 is provided, and thereby, it is possible to support the shaft 13 slidably. In this case, to the shaft 13, not only a six axial shaft rotary operation due to a relative displacement of the inner race 5 to the outer race 6 but also a frequent appearance operation to the inner race 5 are given, which enables it to become applicable to a various kind of field.

For reference, by applying the following hardening treatment to at least to the surface (rolling surface) of the inner race 5, the outer race 6 and the balls 8, the load resistance and the endurance are preferably more increased. Concretely, as a hardening treatment, sintering, ceramics coating (LC-s of Union Carbide Inc. is preferable) and titan coating (TiN) and so on are mentioned.

Since the present invention is constituted as such, the following effects are expected.

First, according to the first aspect of the free spherical ball bearing of the present invention, it is preferable to provide a bearing mechanism which is superior in a load resistance and endurance, large in swinging and in a high level of the operation precision and the smooth operation.

Further, according to the second, third, fourth or fifth aspect of the free spherical ball bearing of the present invention, by making the shell-like retainer deformed positively due to the divided parts and absorbing the interference between members at the time of the assembling the outer race, the inner race and the balls, it becomes possible to assemble easily the free spherical ball bearing.

Further, according to the sixth, seventh or eighth aspect of the free spherical ball bearing of the present invention, it becomes possible to reduce the rotary resistance and to increase the endurance. Further, according to the ninth or tenth aspect of the free spherical ball bearing of the present invention, it becomes possible to spread the applicable field of the free spherical ball bearing. And that, according to the eleventh aspect of the free spherical ball bearing of the present invention, it becomes possible further to increase the load resistance and the endurance.

Further, according to the twelfth aspect of the assembling method if the free spherical ball bearing, it becomes possible to obtain a bearing mechanism which is free of the rotary direction, superior in load resistance and endurance, and provided with a high level of operation precision and operation smoothness, and, according to the thirteenth, fourteenth and fifteenth aspect of the assembling method of the free spherical ball bearing, it becomes possible to assemble the free spherical ball bearing easily.

What is claimed is:

1. An assembling method for a free spherical ball bearing, in which balls are supported through a shell-like retainer divided at least at one portion thereof and enabled to be deformed resiliently between a spherical inner race and an outer race which surrounds one portion of the inner race in a unitary manner, wherein the inner race is covered with the retainer and, after the retainer and inner race are inserted in the outer race, the balls coupled with the retainer provide the spherical ball bearing.

2. An assembling method of a free spherical ball bearing according to claim 1, wherein, after covering the inner race with the retainer, the retainer is made reduced in its outer diameter and then inserted in the outer race.

3. An assembling method of a free spherical ball bearing according to claim 2, wherein, after covering the inner race with the retainer, the retainer is made deflected along a dividing line and inserted in the outer race.

4. An assembling method of a free spherical ball bearing according to claim 1, wherein, after covering the inner race with one divided retainer portion and being inserted in the outer race, the other portion of the retainer is inserted in a gap between the inner race and the outer race.

* * * * *